US010800266B2

(12) United States Patent
Sponheimer et al.

(10) Patent No.: US 10,800,266 B2
(45) Date of Patent: Oct. 13, 2020

(54) MOBILITY SYSTEM THAT CHARGES A DRIVE BATTERY OF AN ELECTRICALLY DRIVABLE MOTOR VEHICLE

(71) Applicant: FORD MOTOR COMPANY, Dearborn, MI (US)

(72) Inventors: Arnulf Sponheimer, Aachen (DE); Markus Kees, Aachen (DE)

(73) Assignee: Ford Motor Company, Dearborn, MI (US)

(*) Notice: Subject to any disclaimer, the term of this patent is extended or adjusted under 35 U.S.C. 154(b) by 134 days.

(21) Appl. No.: 15/890,968

(22) Filed: Feb. 7, 2018

(65) Prior Publication Data
US 2018/0222338 A1 Aug. 9, 2018

(30) Foreign Application Priority Data

Feb. 8, 2017 (DE) .................... 10 2017 201 975

(51) Int. Cl.
| B60L 50/64 | (2019.01) |
| B60L 53/80 | (2019.01) |
| B60L 53/60 | (2019.01) |
| B62D 55/08 | (2006.01) |
| B62D 55/075 | (2006.01) |
| B60L 11/18 | (2006.01) |
| B60L 53/36 | (2019.01) |

(52) U.S. Cl.
CPC ........... *B60L 11/1822* (2013.01); *B60L 50/64* (2019.02); *B60L 53/36* (2019.02); *B60L 53/60* (2019.02); *B60L 53/80* (2019.02); *B62D 55/075* (2013.01); *B62D 55/08* (2013.01); *B60L 2200/40* (2013.01); *Y02T 10/7005* (2013.01); *Y02T 90/124* (2013.01)

(58) Field of Classification Search
None
See application file for complete search history.

(56) References Cited

U.S. PATENT DOCUMENTS 3,690,397 A 9/1972 Parker
5,821,731 A * 10/1998 Kuki .................. B60L 53/126
320/108

(Continued)

FOREIGN PATENT DOCUMENTS

| CN | 202163415 U | 3/2012 |
| CN | 203020284 U | 6/2013 |

(Continued)

OTHER PUBLICATIONS

DE Examination Report for DE 10 2017 201 975.1 dated Jan. 30, 2018, 7 pages.

*Primary Examiner* — Abdhesh K Jha
(74) *Attorney, Agent, or Firm* — Gregory P. Brown; Brooks Kushman, P.C.

(57) ABSTRACT

A mobility system includes an electrically drivable motor vehicle and an electrically drivable battery transport cart. A rechargeable drive battery of the motor vehicle is received in the battery transport cart. The battery transport cart can be releasably inserted into a downwardly open region of a supporting structure of the motor vehicle. The disclosure also relates to a battery transport cart, an electrically drivable motor vehicle and a method to charge a rechargeable drive battery of an electrically drivable motor vehicle.

19 Claims, 9 Drawing Sheets

(56) References Cited

U.S. PATENT DOCUMENTS

| | | | | |
|---|---|---|---|---|
| 8,146,694 B2* | 4/2012 | Hamidi | ................... | B60R 16/04 |
| | | | | 180/68.5 |
| 2009/0058355 A1* | 3/2009 | Meyer | ................... | B60L 53/305 |
| | | | | 320/104 |
| 2015/0021137 A1* | 1/2015 | Lindemann | ............. | F16H 41/24 |
| | | | | 192/3.29 |
| 2016/0303990 A1* | 10/2016 | Penilla | ................... | G06F 3/0488 |

FOREIGN PATENT DOCUMENTS

| | | |
|---|---|---|
| CN | 104890710 A | 9/2015 |
| CN | 204885254 U | 12/2015 |
| DE | 4140508 A1 | 6/1993 |
| DE | 4320993 A1 | 1/1995 |
| DE | 4427322 A1 | 2/1996 |
| DE | 10324170 A1 | 12/2004 |
| DE | 102007054258 A1 | 5/2009 |
| DE | 102010017292 A1 | 12/2011 |
| KR | 102015141445 A | 12/2015 |
| WO | 2000058139 A1 | 10/2000 |

* cited by examiner

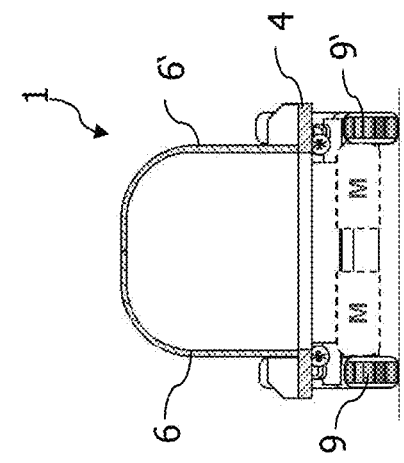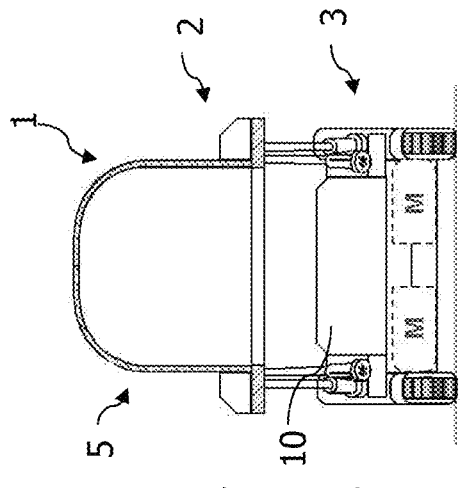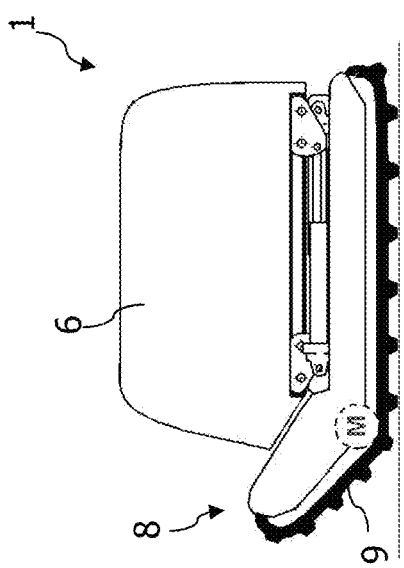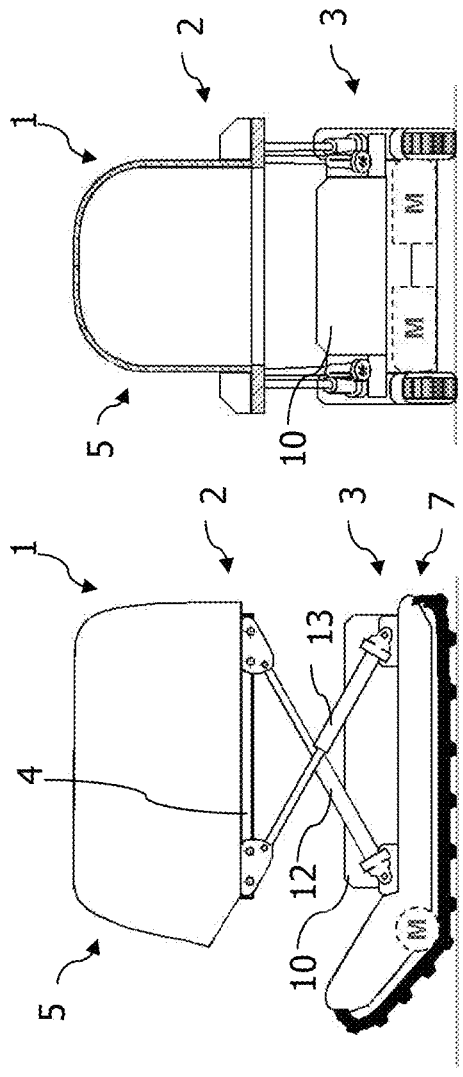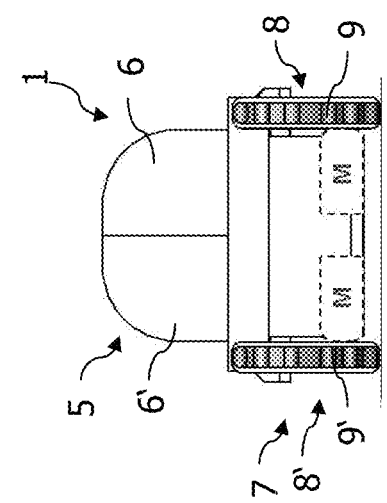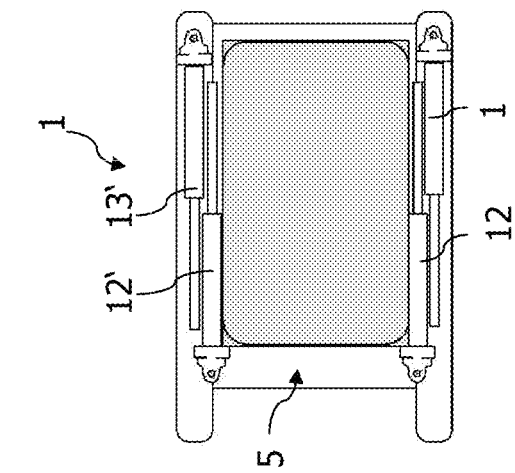

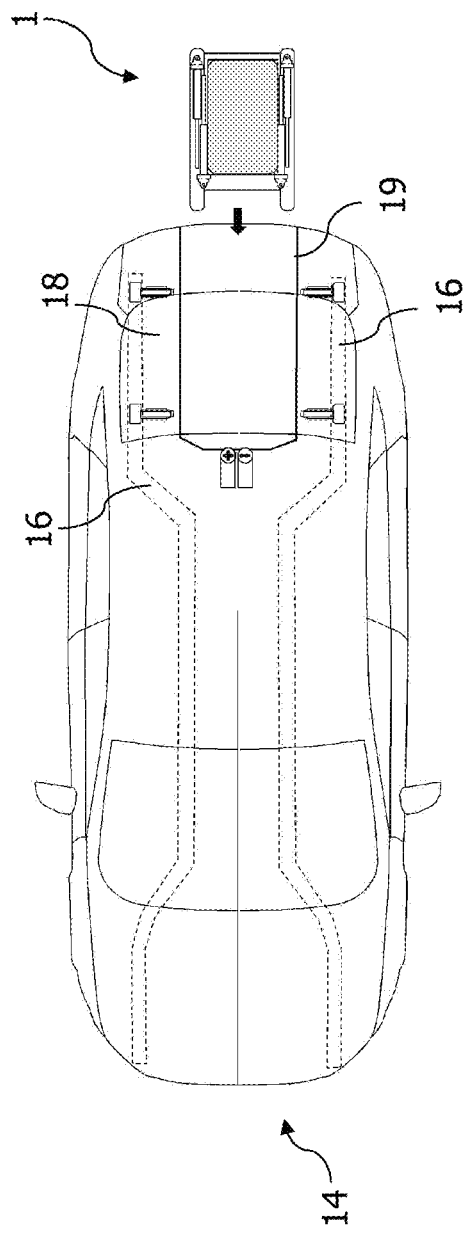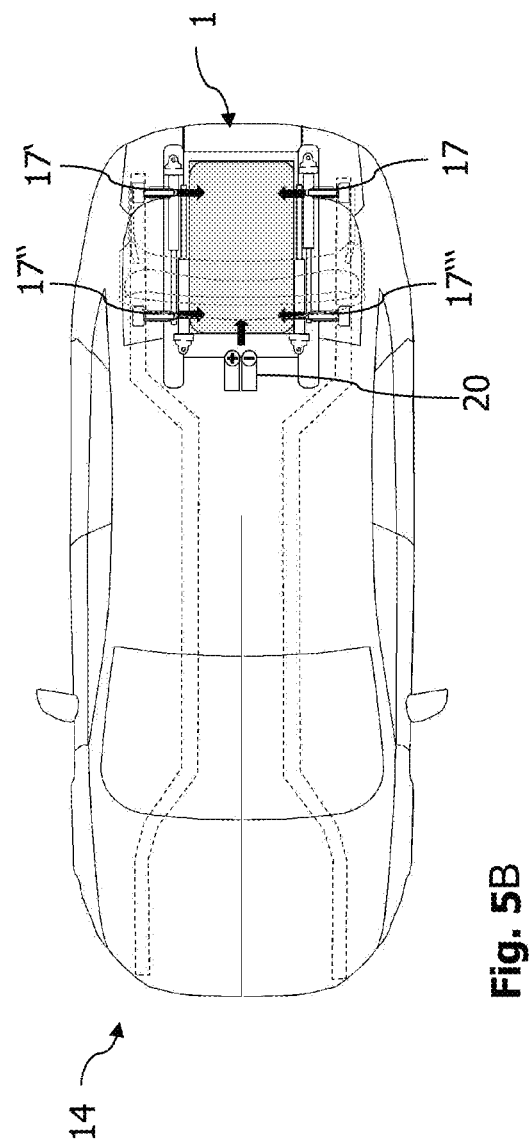

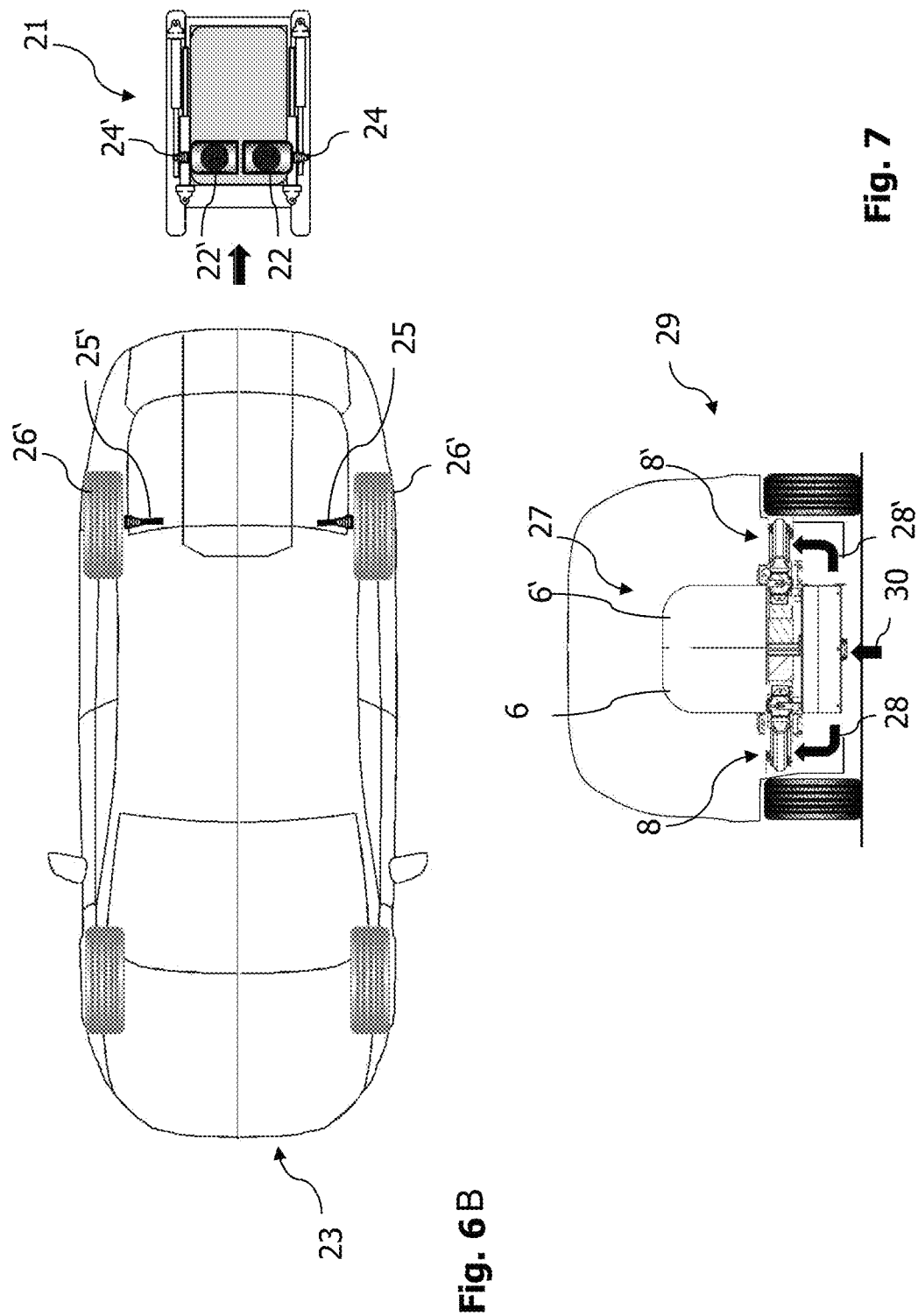

MOBILITY SYSTEM THAT CHARGES A DRIVE BATTERY OF AN ELECTRICALLY DRIVABLE MOTOR VEHICLE

CROSS-REFERENCE TO RELATED APPLICATIONS

This application claims foreign priority benefits under 35 U.S.C. § 119(a)-(d) to DE Application 10 2017 201 975.1 filed Feb. 8, 2017, which is hereby incorporated by reference in its entirety.

TECHNICAL FIELD

The disclosure relates to a mobility system that has an electrically drivable motor vehicle and an electrically drivable battery transport cart to charge a drive battery of an electrically drivable motor vehicle.

BACKGROUND

Battery-operated motor vehicles generally have a rechargeable drive battery, which has to be charged at an external power connection after it is discharged through the operation of the motor vehicle. A common household power connection at 240 volts or 110 volts alternating current, for example, can be sufficient for this. In a particularly advantageous manner, the drive battery can be charged at night, for example, so that the motor vehicle is fully operational again in the morning. This requires a corresponding power connection to be available in the vicinity of the motor vehicle that is parked overnight. Therefore, if the motor vehicle is parked in a public parking place, for example at the side of the road, it is generally not possible to charge the drive battery. The same applies to many underground parking lots and parking garages in which there is likewise no charging facility. The lack of charging facilities is a considerable obstacle to the growth of electrically operated motor vehicles, particularly in urban areas. Therefore, drive batteries that can be separated from the motor vehicle have been proposed, which have their own drive that can be used to transport the battery to a remote power connection for them to be charged there and then transported back to the motor vehicle again.

CN 203020284 U discloses an intelligent battery system for electric motor vehicles, in which the battery of the motor vehicle can be moved by motor-operated crawler tracks. A user can control the movement of the battery by means of a remote control. By means of laser radar and a three-dimensional camera system, a computer processor of the battery detects environmental information, which can be processed to realize an automatic movement. The battery moves automatically into the body of a motor vehicle and is fixed therein. In this case, the battery is pulled via an inclined guide plate into an interior space within the body of the motor vehicle by means of a pull wire.

CN 104890710 A discloses a power supply cart for an electric vehicle, which comprises a battery which can provide the drive energy for the power supply cart, wherein the power supply cart can be placed in the electric vehicle and can provide the energy for the electric vehicle. The power supply cart is also constructed for transporting people.

However, it has been shown that the known solutions having a battery transport cart that can be moved separately from the motor vehicle are not optimal both in terms of the use of space within the motor vehicle and also in terms of the sequence for separating and integrating the battery from and into the motor vehicle.

SUMMARY

It is the object of the present disclosure to provide an electrically drivable battery transport cart, an electrically drivable motor vehicle and a method to charge a drive battery of an electrically drivable motor vehicle, wherein the above-mentioned disadvantages can be prevented to the greatest extent possible.

This object is achieved by a mobility system having a battery transport cart, an electrically drivable motor vehicle, and by a method as described below.

A mobility system according to the disclosure comprises an electrically drivable motor vehicle and a battery transport cart. The electrically drivable motor vehicle has a rechargeable drive battery, which serves to supply energy to at least one electric drive motor of the motor vehicle. The drive battery is constructed as an accumulator. The electrically drivable motor vehicle can be an exclusively, electrically driven motor vehicle, which is also known as a battery electric vehicle (BEV) or also, for example, as a plug-in hybrid electric vehicle (PHEV). The motor vehicle can be for example an automobile or a truck. The rechargeable drive battery of the motor vehicle is received in a battery transport cart, which is likewise electrically drivable. For this, the battery transport cart has a chassis with which the battery transport cart can move independently of the motor vehicle. The battery transport cart can preferably be electrically connected to an electrical system of the motor vehicle.

According to the disclosure, the battery transport cart can be releasably inserted into a downwardly open region of a supporting structure of the motor vehicle. The downwardly open region can be, for example, a recess or a convexity in a floor region of the motor vehicle or, for instance, a clearance formed between two side members of the motor vehicle, or equally a cut-away region of a floor of the motor vehicle, for example. The downwardly open region is preferably also open in a horizontal direction, in particular to a rear or to a front. To operate the motor vehicle, the battery transport cart with the drive battery of the motor vehicle is therefore inserted into the downwardly open region of the supporting structure of the motor vehicle, in particular into a downwardly open indentation in the supporting structure, and preferably mechanically integrated in the supporting structure. To charge the drive battery, the battery transport cart can be released from the supporting structure of the motor vehicle and moved separately from the motor vehicle.

Since the battery transport cart, which comprises the rechargeable drive battery of the electrically driven motor vehicle, can be inserted into a downwardly open region, for instance into an indentation in the supporting structure of the motor vehicle, it is possible to enable a particularly favorable use of space of the motor vehicle and simple insertion and release of the battery transport cart into, and from, the supporting structure of the motor vehicle. In particular, the motor vehicle and the battery transport cart can be constructed such that the battery transport cart is arranged below a trunk of the motor vehicle and does not hinder the use of the trunk even in the inserted state. Furthermore, it can thus be achieved that the drive battery of the motor vehicle, which generally has a considerable mass, is arranged in a lower region of the motor vehicle so that the center of gravity of the motor vehicle is low, which is favorable in driving mode of the motor vehicle. Finally, it is also possible to thus enable swift and unhindered removal and reinsertion of the battery transport cart with the drive battery of the motor vehicle.

According to a preferred embodiment of the disclosure, the motor vehicle has a holding device that fixedly holds the battery transport cart in the downwardly open region of the supporting structure. The holding device can be formed, for example, by a plurality of horizontally displaceable locking bolts that can be engaged in the battery transport cart for insertion of this latter and disengaged again for releasing the battery transport cart. The holding device can cooperate with the battery transport cart such that this latter becomes an integral component of the supporting structure of the motor vehicle. It is thus possible to enable reliable holding of the battery transport cart in the supporting structure of the motor vehicle without impairing the stability of the motor vehicle in driving mode.

According to a preferred embodiment of the disclosure, the holding device is constructed such that the battery transport cart is adjustable in the vertical direction with respect to the supporting structure of the motor vehicle by the holding device. In particular, the holding device is constructed to lift the battery transport cart as the holding device is closed and to lower it as the holding device is released. As the battery transport cart is released, the battery transport cart can therefore be lowered onto a roadway that the motor vehicle is parked and can be moved independently of the motor vehicle. Conversely, for insertion into the motor vehicle, the battery transport cart can be moved into the holding device and then lifted off the roadway by this so that the battery transport cart does not hinder the driving operation of the motor vehicle.

According to a particularly preferred embodiment of the disclosure, the battery transport cart has an upper part and a lower part, wherein the upper part is constructed for releasable insertion into the downwardly open region of the supporting structure of the motor vehicle and the lower part comprises the chassis of the battery transport cart. The upper part is adjustable in the vertical direction with respect to the lower part by an adjusting mechanism. The lower part can be constructed for example as a chassis frame of the battery transport cart. The chassis is therefore adjustable in the vertical direction by the adjusting mechanism and can be lifted or lowered with the aid of the adjusting mechanism when the upper part is inserted into the supporting structure of the motor vehicle. It is thus particularly, easily possible to enable the chassis of the battery transport cart to be lifted off a roadway during the insertion into the downwardly open region of the supporting structure of the motor vehicle and to be deposited accordingly onto the roadway when the battery transport cart is released.

The battery transport cart preferably has a platform that is constructed for insertion into the downwardly open region of the supporting structure. In particular, the platform can form the upper side of the battery transport cart, for instance the upper part of the battery transport cart, and be constructed as a loading area, which then terminates approximately planar with a loading area of the motor vehicle when the battery transport cart is inserted into the supporting structure of the motor vehicle and therefore forms part of a trunk floor of the motor vehicle. It is thus possible to achieve a further improved use of space of the motor vehicle.

In an advantageous manner, the adjusting mechanism can furthermore be constructed such that the platform is pivotable about a longitudinal axis and/or a transverse axis of the battery transport cart with respect to the chassis. It is thus possible, for example, to achieve that the platform can also be held in a horizontal position when the battery transport cart moves over an incline.

The adjusting mechanism preferably comprises at least two, in particular four, lifting cylinders so that the upper part is adjustable with respect to the lower part by the at least two lifting cylinders. Both the lifting and lowering of the lower part with respect to the upper part and, where applicable, also the pivoting of the platform about a longitudinal and/or transverse axis can thus be enabled. The lifting cylinders can be driven for example hydraulically, pneumatically or by threaded spindles.

According to a preferred embodiment of the disclosure, the chassis of the battery transport cart has at least two crawlers that each comprise a crawler track guided in a longitudinal direction of the battery transport cart. It is thus possible to enable irregular terrain or even steps to be negotiated by the battery transport cart.

It is furthermore preferred that the at least two crawlers are each pivotable about a pivot axis that is parallel to a longitudinal axis of the battery transport cart. It is thus possible, in the inserted state, to additionally increase a spacing between the chassis and a roadway that the motor vehicle travels.

The battery transport cart can preferably be supplied with electrical energy by the drive battery of the motor vehicle, the drive of the battery transport cart is powered by the drive battery. For this, it can be provided that a control device of the electric drive of the motor vehicle is designed such that a residual amount of energy always remains in the drive battery, which enables the battery transport cart to cover a sufficient distance, for example approximately 1 to 3 km. It is thus always possible to ensure reliable transportation of the drive battery to a power connection that is suitable to charge purposes.

In an advantageous manner, the battery transport cart can be controlled by an external control device via a wireless connection. The external control device can be for example a smartphone. Alternatively or additionally, the battery transport cart can be equipped for autonomous operation and have a corresponding control device and sensor technology for this. The battery transport cart can thereby autonomously follow a user, for example, who proceeds from the motor vehicle to a charging facility for the battery and is carrying a smartphone. The charging of the drive battery at a site that is remote from the parking spot of the motor vehicle is thus further facilitated.

According to a preferred embodiment of the disclosure, the battery transport cart comprises at least one drive motor of the motor vehicle, which can be coupled to at least one drive shaft of the motor vehicle. In a particularly preferred manner, the battery transport cart comprises all drive motors of the motor vehicle, for example two drive motors, which can then be coupled to a drive shaft of a respective drive wheel of the motor vehicle when the battery transport cart is inserted into the downwardly open region of the supporting structure. It is thus possible to dispense with an electrical connection of the battery transport cart to the motor vehicle for transmitting a drive power that has a very high current strength and a high voltage. It is possible to completely dispense with an electrical connection of the battery transport cart to the motor vehicle here, or such a connection can be configured solely for powering other consumers of the motor vehicle.

An inventive battery transport cart for an electrically drivable motor vehicle comprises a rechargeable drive battery of the motor vehicle. The battery transport cart is electrically drivable and has a chassis with which the battery transport cart can move independently of the motor vehicle. The battery transport cart furthermore has an upper part and a lower part, wherein the upper part is constructed for releasable insertion into a downwardly open region of a supporting structure of the motor vehicle and the lower part comprises the chassis of the battery transport cart. The lower part, and therefore the chassis of the battery transport cart, is adjustable in the vertical direction with respect to the upper part. When the battery transport cart is inserted into the supporting structure of the motor vehicle, the chassis can therefore be lowered and lifted relative to the supporting structure. For this, the battery transport cart can have an adjusting mechanism, for example constructed with lifting cylinders. In particular, the battery transport cart is suitable for a mobility system according to the disclosure and is constructed as described above.

A motor vehicle according to the disclosure is an electrically drivable motor vehicle having a rechargeable drive battery, wherein the drive battery is received in an electrically driven battery transport cart. A supporting structure of the motor vehicle has a downwardly open region into which the battery transport cart can be releasably inserted and can be held therein by a holding device. In particular, the motor vehicle is suitable for a mobility system according to the disclosure and is constructed as described above.

According to an inventive method to charge a rechargeable drive battery of an electrically drivable motor vehicle, wherein the drive battery is received in an electrically driven battery transport cart that has a chassis and is inserted into a downwardly open region of the supporting structure of the motor vehicle, a chassis of the battery transport cart is lowered onto a roadway, for example in that the battery transport cart as a whole, or only a lower part that has the chassis, is lowered. The battery transport cart is separated mechanically, and where appropriate electrically, from the motor vehicle and, by a drive of the battery transport cart, is moved out of the downwardly open region of the supporting structure and to a suitable power connection. The drive battery is charged there. With the aid of its drive, the battery transport cart is then moved back to the motor vehicle and into the downwardly open region of the supporting structure and inserted therein. Finally, the chassis is lifted off the roadway. The battery transport cart is mechanically, and where appropriate electrically, connected to the motor vehicle here. The motor vehicle and the battery transport cart are preferably constructed as described above.

The disclosure is explained in more detail below by way of example with reference to the drawings, which show:

BRIEF DESCRIPTION OF THE DRAWINGS

FIGS. 1A to 1F are a first exemplary embodiment of a battery transport cart according to the disclosure in different views;

FIGS. 5A to 5C depict insertion of the battery transport cart into a motor vehicle according to the first exemplary embodiment of the disclosure in a partially transparent plan view;

FIGS. 6A and 6B depict motor vehicle and a battery transport cart according to a second exemplary embodiment of the disclosure; and FIG. 7 depicts a motor vehicle and a battery transport cart according to a third exemplary embodiment of the disclosure.

DETAILED DESCRIPTION

Figure 2:
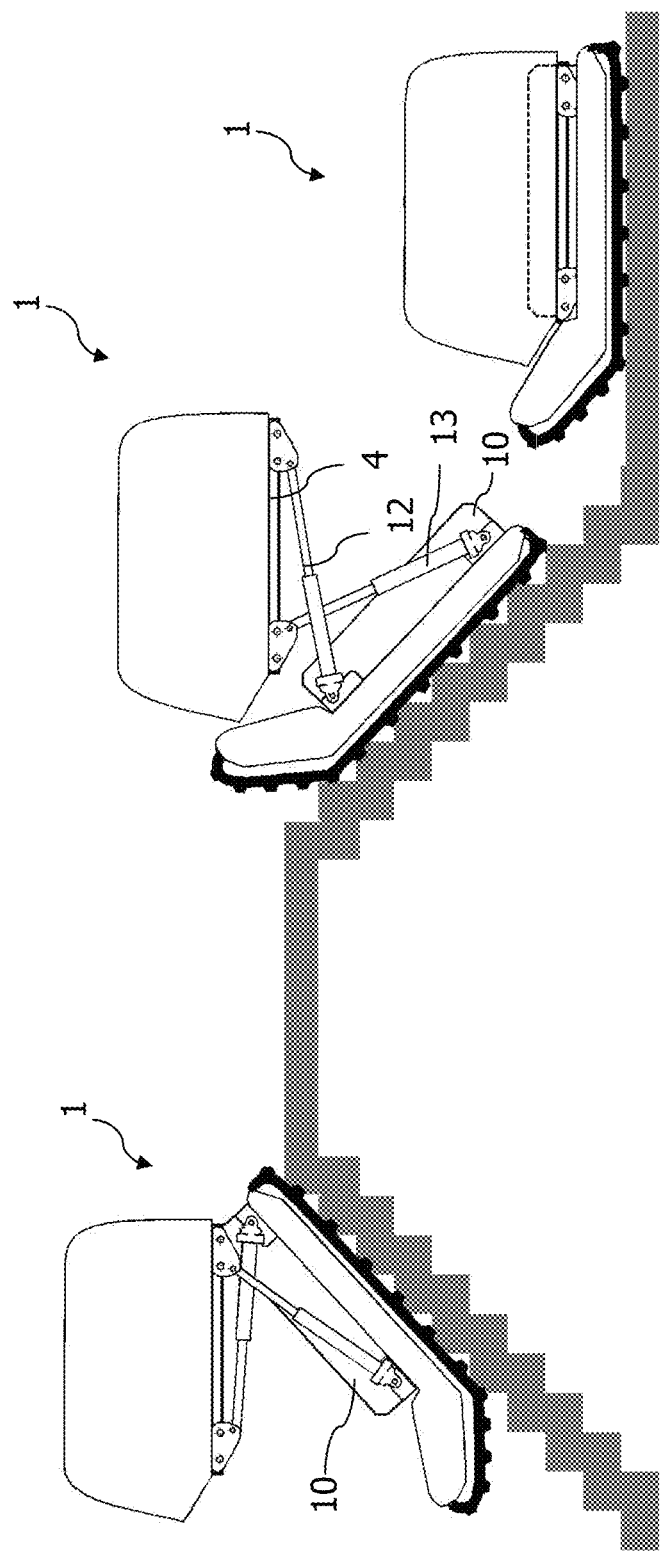
FIG. 2 depicts a use of a battery transport cart to negotiate slopes, by way of example.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In FIGS. 1A to 1F, a first exemplary embodiment of a battery transport cart 1 according to the disclosure is illustrated in different views. FIG. 1A here shows a view from the front, FIG. 1B shows a side view, FIG. 1C shows a partially sectional view from the rear and FIG. 1D shows a plan view from above. FIGS. 1E and 1F show the battery transport cart 1 with a lifted upper part in views which correspond to FIGS. 1B and 1C.

The battery transport cart 1 comprises an upper part 2 and a lower part 3. The upper part 2 is constructed as a platform 4 with a fitted hood 5, which comprises two hood parts 6, 6' that are pivotably connected to the platform 4 in an articulated manner. Loads that can be transported by the battery transport cart 1 are received on the platform 4 or in the hood 5. The division of the hood 5 into two hood parts 6, 6' is not illustrated in all figures.

The lower part 3 of the battery transport cart 1 comprises a chassis frame 7, which supports a chassis formed by two crawlers 8, 8'. The crawlers 8, 8' each have a flexible crawler track 9, 9', for example made of rubber, and corresponding rollers for guidance and for driving the crawler tracks 9, 9'. To drive the crawler tracks 9, 9', a respective electric motor M is furthermore provided. The lower part 3 furthermore comprises the drive battery 10 of an electrically drivable motor vehicle, which is in particular an accumulator. The drive battery can be a high voltage battery and have for example a capacity of 8 to 14 kWh, which is, in particular, sufficient for a plug-in hybrid electric vehicle (PHEV).

The upper part 2 and the lower part 3 are connected to one another via an adjusting mechanism 11, which comprises four lifting cylinders 12, 12', 13, 13' that cooperate in pairs and are each connected to the lower part 3 and the upper part 2, or to the chassis frame 7 and the platform 4 in an articulated manner via a swivel joint. As can be seen in particular in FIGS. 1D and 1F, the upper part 2 can be adjusted in the vertical direction through an equal change in length of the lifting cylinders 12, 12' 13, 13'.

It is shown in FIG. 2 how the battery transport cart 1 can negotiate a slope and gradients, in particular steps. To drive the crawler tracks 9, 9', the electric motors M (see above) here are supplied with power by the drive battery 10 of the motor vehicle, as is a drive of the lifting cylinder 12, 12', 13, 13'. Through an unequal change in length of the lifting cylinders 12, 13 and 12', 13', the platform 4 can also be held in a horizontal position when negotiating slopes. It is thus possible to transport sensitive items on the platform 4 or within the hood 5 and likewise to optionally transport people on a seat (not illustrated) that is mounted on the platform 4 instead of the hood 5. The battery transport cart 1 has a control device with corresponding sensor and processor means, which is constructed in a manner known per se.

Figure 3A:
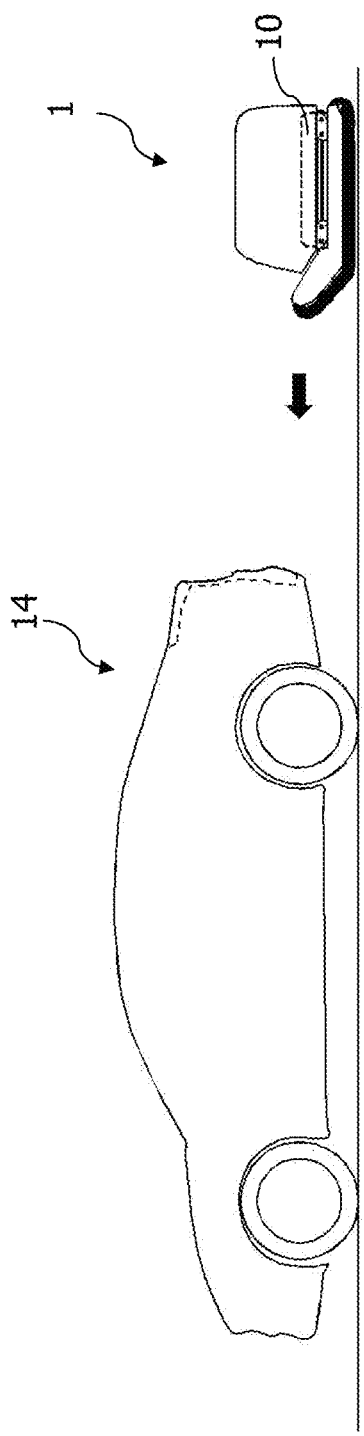
FIGS. 3A to 3F depict insertion of the battery transport cart into a motor vehicle according to the first exemplary embodiment of the disclosure in a transparent side view.
Figure 3B:
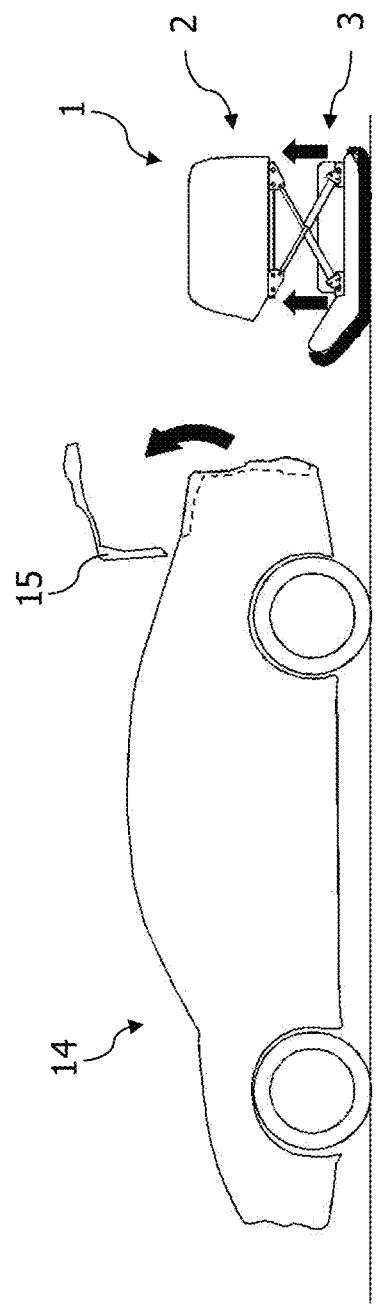
Figure 3C:
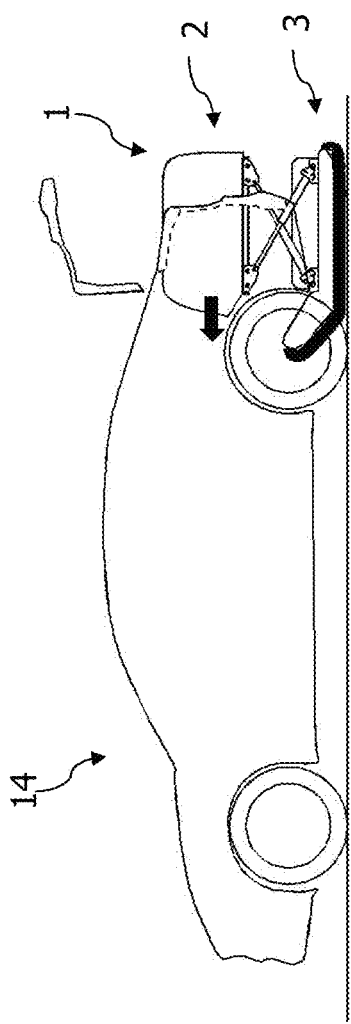
Figure 3D:
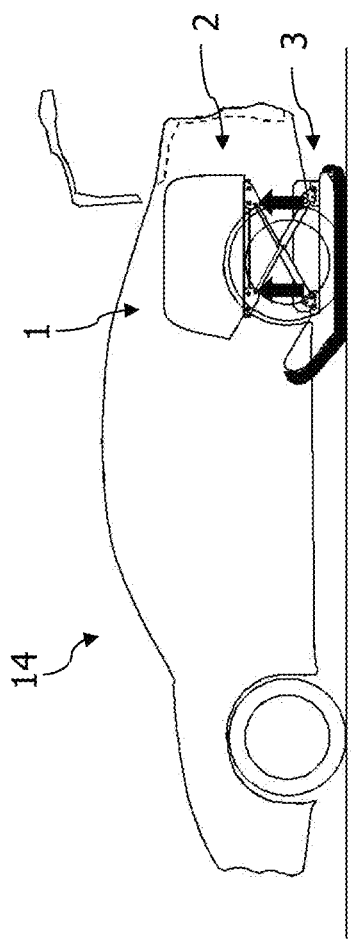
Figure 3E:
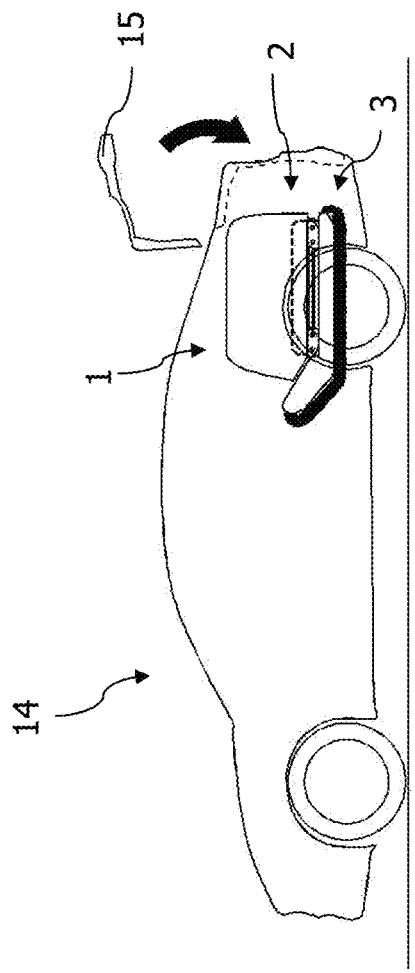
Figure 3F:
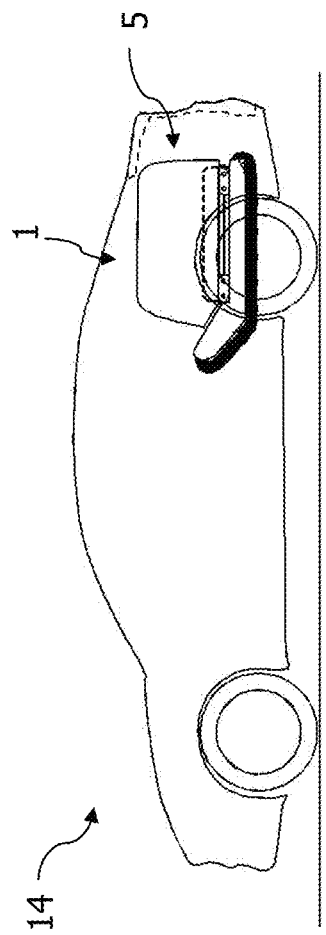

FIGS. 3A to 3F illustrate the integration of the battery transport cart 1 with a charged drive battery 10 into a motor vehicle 14 that is to be operated by the drive battery 10. The individual steps are controlled by the control device of the battery transport cart 1 and a control device of the motor vehicle 14, which communicate with one another via a wireless connection. As shown in FIG. 3A, the battery transport cart 1 with the charged drive battery 10 approaches the motor vehicle 14 from the rear. Shortly before reaching the motor vehicle 14, through an adjustment of the lifting cylinders 12, 12', 13, 13', the upper part 2 of the battery transport cart is lifted to a height that corresponds approximately to that of a trunk floor of the motor vehicle 14. At the same time, the trunk lid 15 of the motor vehicle 14 opens (see FIG. 3B). The battery transport cart 1 then moves into a cut-away indentation in the trunk floor of the motor vehicle 14, which corresponds to a corresponding, downwardly open region of a supporting structure of the motor vehicle 14 (FIG. 3C). The upper part 2 is supported against the supporting structure of the motor vehicle 14 and is secured by inserting locking bolts (not illustrated) into the platform 4. An electrical connection between the drive battery 10 and the electrical system of the motor vehicle 14 is moreover automatically produced, for instance through the insertion of a corresponding plug of the motor vehicle 14 into a socket of the battery transport cart 1. By shortening the lifting cylinders 12, 12', 13, 13', the lower part 3 with the chassis and the crawlers 8, 8' is lifted and the trunk lid 15 is closed (see FIGS. 3D, 3E). The motor vehicle 14 is now operational (FIG. 3F). It is additionally optionally possible for the two hood parts 6, 6' to be folded apart to enable the trunk of the motor vehicle 14 to be used in its entirety.

Figure 4A:
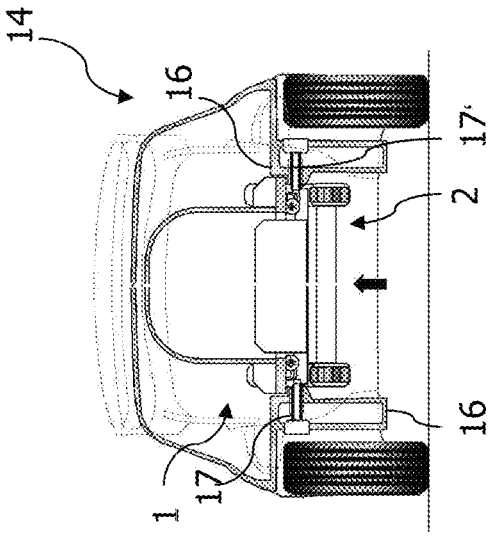
FIGS. 4A to 4D depict insertion of the battery transport cart into a motor vehicle according to the first exemplary embodiment of the disclosure in a sectional view.
Figure 4B:
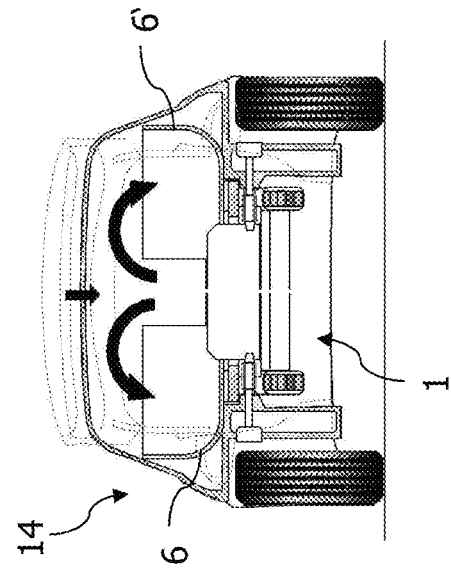
Figure 4C:
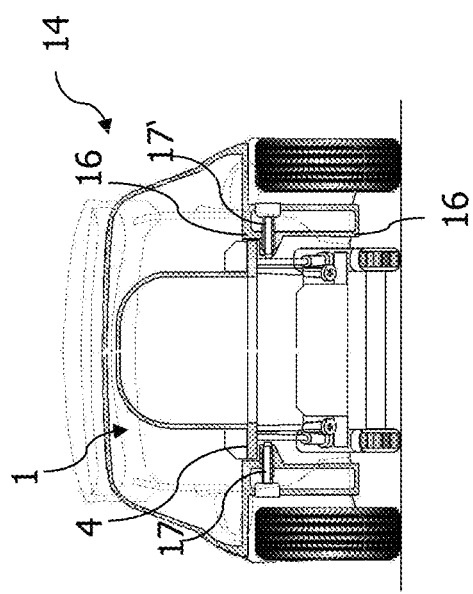
Figure 4D:
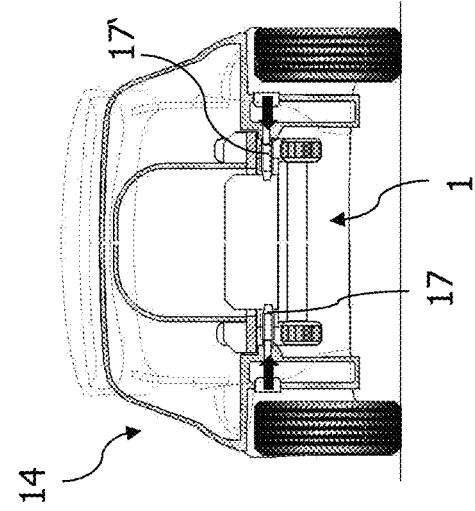

The steps shown in FIGS. 3C to 3F are illustrated again in FIGS. 4A to 4D in a cross-section of the motor vehicle 14. To fix the battery transport cart 1 within the supporting structure 16, locking bolts 17, 17' are provided that are still in a retracted position (FIG. 4A) when the battery transport cart 1 is moved into a downwardly open region of the supporting structure 16 of the motor vehicle 14, which is formed by the clearance between two side members. The lower part 3 of the battery transport cart is lifted after the battery transport cart has moved into the region of the supporting structure 16. The platform 4 of the battery transport cart 1 is supported on corresponding projections of the supporting structure 16 here. The upper side of the platform 4 terminates approximately with a trunk floor 18 of the motor vehicle (FIG. 4B). The locking bolts 17, 17' are inserted into corresponding receiving means of the upper part 2 of the battery transport cart 1 (FIG. 4C). Finally, the hood parts 6, 6' are folded apart to produce a uniform, readily usable trunk (FIG. 4D).

Figure 5C:
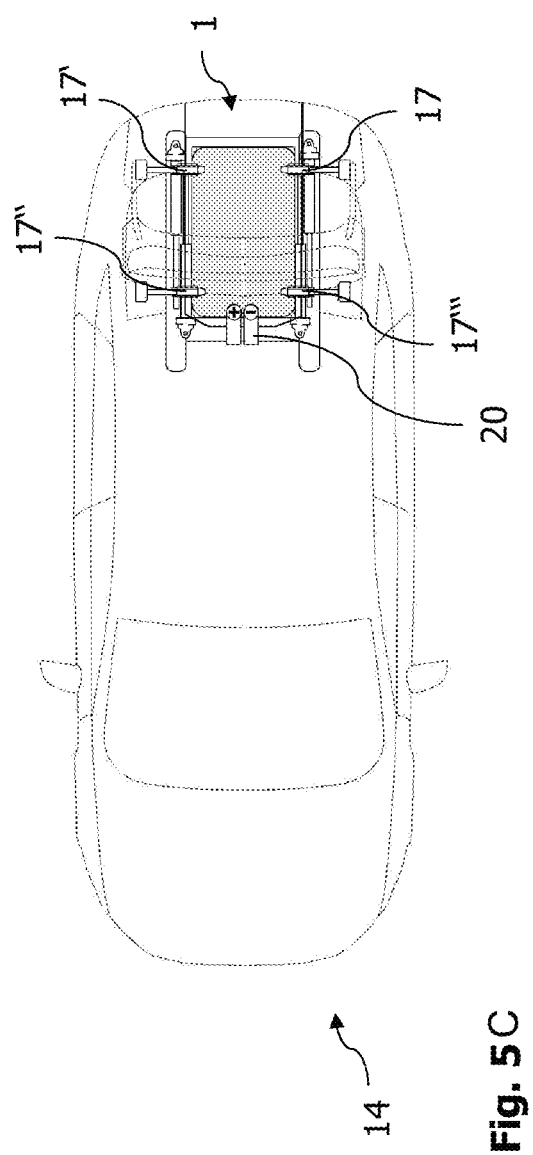

The steps shown in FIGS. 3C to 3E and 4A to 4C are illustrated again in FIGS. 5A to 5C in plan view. As can be seen in particular in FIG. 5A, the battery transport cart moves into a downwardly open region of the supporting structure 16 of the motor vehicle 14, which corresponds to a cut-away portion 19 of the trunk floor 18. In the exemplary embodiment shown, four locking bolts 17, 17', 17", 17'" are provided to lock the upper part 2 of the battery transport cart 1 to the supporting structure 16 of the motor vehicle 14. In FIGS. 5A to 5C, a connector plug 20 to connect the drive battery 10 to the electrical system of the motor vehicle 14 is likewise indicated. The electrical connection produced via the connector plug 20 is suitable to transmit a sufficient current strength and voltage to drive the motor vehicle.

The release of the battery transport cart 1 from the motor vehicle 14 takes place in corresponding steps as described above, which are executed in reverse sequence. The release of the battery transport cart 1 can be initiated by a control device of the motor vehicle 14 or by a separate control device, for instance a smartphone having a corresponding app., and can be controlled in conjunction with a control device of the battery transport cart 1, as with the steps to connect the battery transport cart 1 to the motor vehicle 14.

Figure 6A:
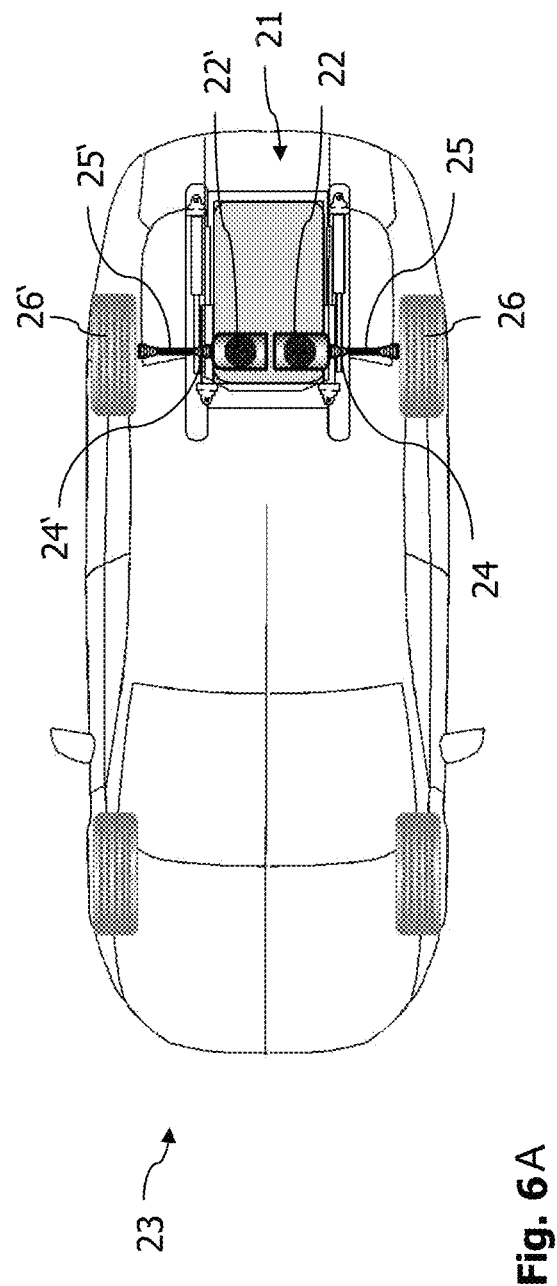

FIGS. 6A and 6B illustrate that, according to a second embodiment of the disclosure, the battery transport cart 21 comprises two electric drive motors 22, 22' of the motor vehicle 23, which are powered by the drive battery 10. The drive motors 22, 22' can also serve to drive the crawler tracks 9, 9' or can be additional motors adapted in particular for the drive of the motor vehicle 23. When the battery transport cart 21 is connected to the supporting structure of the motor vehicle 23, the drive motors 22, 22' are coupled to the drive wheels 26, 26' of the motor vehicle 23 via coupling pieces 24, 24' into which drive shafts 25, 25' of the drive wheels 26, 26' are inserted (FIG. 6A). To release the battery transport cart 21, the drive shafts 25, 25' are pulled out of the coupling pieces 24, 24' (FIG. 6B). In this embodiment, the production of an electrical connection between the battery transport cart 21 and the motor vehicle 23 is unnecessary or can be effected in a simplified form since there is no need to transmit drive power, but merely the much lower currents for powering other electrical consumers of the motor vehicle 23. The battery transport cart 21 and the motor vehicle 23 are moreover constructed according to the first embodiment, as described above.

As illustrated in a cross-section in FIG. 7, the crawlers 8, 8' can, according to a third embodiment of the disclosure, be pivotably connected to the chassis frame of the battery transport cart 27 in an articulated manner and be pivoted upwards to lift off the floor (arrows 28, 28'). To facilitate the upward pivoting, it is furthermore provided in this embodiment that the battery transport cart 27 is lifted (arrow 30) as or after it is integrated and locked in the supporting structure of the motor vehicle 29. In this embodiment of the disclosure, the battery transport cart 27 can be designed without an adjusting mechanism and the upper part together with the lower part can form a unit to which the hood parts 6, 6' are connected in an articulated manner. The battery transport cart 27 and the motor vehicle 29 are moreover constructed according to the first exemplary embodiment, as described above.

For the sake of clarity, not all reference signs are illustrated in all figures. Reference signs that are not explained with reference to a figure have the same significance as in the other figures.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:
1. A mobility system comprising:
an electrically drivable motor vehicle having a downwardly open region of a supporting structure; and an electrically drivable battery transport cart configured to receive a rechargeable drive battery of the motor vehicle, and releasably insert into the downwardly open region of the supporting structure, wherein the battery transport cart comprises an upper part articulatably connected to a lower part, the upper part is constructed for releasable insertion into the downwardly open region of the supporting structure, and the lower part comprises a chassis, wherein the upper part is vertically adjustable relative to the lower part.

2. The mobility system as claimed in claim 1 further comprising a holding device that holds the battery transport cart in the downwardly open region of the supporting structure of the motor vehicle.

3. The mobility system as claimed in claim 2, wherein the battery transport cart is adjustable in the vertical direction via the holding device.

4. The mobility system as claimed in claim 1, wherein the upper part is pivotable about a longitudinal or a transverse axis with respect to the lower part such that the upper part is orientable at a first incline angle while the lower part is oriented at a second incline angle.

5. The mobility system as claimed in claim 1, wherein the upper part is adjustable with respect to the lower part with at least two lifting cylinders.

6. The mobility system as claimed in claim 1, wherein the chassis of the battery transport cart has at least two crawlers.

7. The mobility system as claimed in claim 6, wherein the at least two crawlers are each pivotable about an axis parallel to the longitudinal axis of the battery transport cart.

8. The mobility system as claimed in claim 1, wherein a drive of the battery transport cart is powered by the drive battery of the motor vehicle.

9. The mobility system as claimed in claim 1, wherein the battery transport cart is controlled by an external control device via a wireless connection and is autonomously movable.

10. The mobility system as claimed in claim 1, wherein the battery transport cart comprises at least one drive motor of the motor vehicle, which can be coupled to at least one drive shaft of the motor vehicle.

11. An electrically drivable motor vehicle having a rechargeable drive battery comprising:
an electrically driven battery transport cart that has an upper part articulatably adjustable with respect to a lower part in a vertical direction such that the upper part is orientable at a first incline angle while the lower part is oriented at a second incline angle; and
a supporting structure of the motor vehicle that has a downwardly open region into which the battery transport cart can be releasably inserted via the upper part.

12. The electrically drivable motor vehicle as claimed in claim 11 further comprising a holding device that holds the battery transport cart in the downwardly open region of the supporting structure of the motor vehicle.

13. The electrically drivable motor vehicle as claimed in claim 11, wherein the chassis of the battery transport cart has at least two crawlers, each pivotable about an axis parallel to a longitudinal axis of the cart.

14. The electrically drivable motor vehicle as claimed in claim 11, wherein the cart is controlled by an external control device via a wireless connection.

15. A method to charge a vehicle rechargeable drive battery comprising:
receiving the drive battery in an electrically driven battery transport cart that has an upper portion articulatably connected to a chassis; and
inserting the cart into a downwardly open region of a supporting structure by:
lowering the chassis onto a roadway while the upper portion is fixedly secured to the supporting structure,
releasing the battery transport cart from the downwardly open region of the supporting structure,
vertically adjusting the upper portion relative to the chassis to align the chassis upon the roadway,
moving the battery transport cart to a charging connection,
charging the drive battery,
moving the battery transport cart to a vehicle,
vertically adjusting the upper portion to align with the support structure,
inserting the battery transport cart into the downwardly open region of the supporting structure, and
lifting the chassis off the roadway.

16. The method to charge a vehicle rechargeable drive battery as claimed in claim 15 further comprising holding the cart in the downwardly open region of the supporting structure of the motor vehicle via a holding device.

17. The method to charge a vehicle rechargeable drive battery as claimed in claim 15 further comprising controlling the cart by an external control device via a wireless connection.

18. The method to charge a vehicle rechargeable drive battery as claimed in claim 15 further comprising powering a drive of the battery transport cart by the drive battery.

19. The method to charge a vehicle rechargeable drive battery as claimed in claim 15 further comprising adjusting a chassis of a lower part of the cart via at least two lifting cylinders in a vertical direction with respect to an upper part of the cart.

* * * * *